United States Patent [19]

Kranz et al.

[11] Patent Number: 5,430,143
[45] Date of Patent: Jul. 4, 1995

[54] PREPARATION OF METAL PHTHALOCYANINES BY REACTING ORTHO-DINITRILES WITH METAL COMPLEXES

[75] Inventors: Joachim Kranz, Ludwigshafen; Wolfgang Habermann, Mainz, both of Germany

[73] Assignee: BASF Aktiengesellschaft, Ludwigshafen, Germany

[21] Appl. No.: 135,335

[22] Filed: Oct. 13, 1993

[30] Foreign Application Priority Data

Oct. 15, 1992 [DE] Germany ............... 42 34 711.4

[51] Int. Cl.$^6$ ............................. C09B 47/067
[52] U.S. Cl. ............................................. 540/143
[58] Field of Search ................................. 540/143

[56] References Cited

U.S. PATENT DOCUMENTS 3,985,767 10/1976 Nicaise et al. ............... 260/314.5

FOREIGN PATENT DOCUMENTS 2006663  2/1970 Germany.
3135388 11/1986 Japan.
216870   3/1925 United Kingdom.

*Primary Examiner*—Mukund J. Shah
*Assistant Examiner*—Pavanaram Sripada
*Attorney, Agent, or Firm*—Keil & Weinkauf

[57] ABSTRACT

A process is described for preparing metal phthalocyanines by reacting orthodinitriles dissolved or suspended in organic solvents or pulverulent mixtures of orthodinitriles with anhydrous ammine-metal carboxylate salts or metal-aminocarboxylic acid complexes without alkaline or chloride-containing additaments using an ortho-dinitrile excess of from 0.1 to 5% by weight.

9 Claims, No Drawings

PREPARATION OF METAL PHTHALOCYANINES BY REACTING ORTHO-DINITRILES WITH METAL COMPLEXES

The present invention relates to a process for preparing metal phthalocyanines by reacting dissolved or suspended aromatic ortho-dinitriles with metal donors in organic solvents or mixtures of pulverulent ortho-dinitriles with metal donors by baking.

DE-A-2 006 663 describes a process for preparing metal phthalocyanines from aromatic o-dinitriles and pulverulent metals or certain compounds of these metals. The reaction takes place between 10° and 100° C. in organic solvents in the presence of hydroxides, oxides, peroxides or carbonates of alkali metals or alkaline earth metals. The yield of metal phthalocyanines is about 70 to 75%, based on the o-dinitrile used.

This process is improved by the method disclosed in DE-A-2 006 707 by adding to the reaction mixture a complexing agent for the metals. This raises the metal phthalocyanine yield to 93%. Both the methods have the disadvantage that the products are contaminated by phthalimide, metal isoindolenines and triazines and that with a number of metals the yields of metal phthalocyanines are distinctly below 90%.

Furthermore, GB 216 870 describes a process wherein metal phthalocyanines are prepared by electrochemical reaction of aromatic o-dinitriles with metal salts in virtually anhydrous solvents in the presence of alkali metal alkoxides or alkali metal amides by passing in hydrogen. More than 95% pure metal phthalocyanines are obtained in yields of >90%.

The disadvantage of this process is that the metal phthalocyanine obtained is contaminated with alkali metal and copper or other metal salts and has to be purified and finished in a number of operations, and presents effluent problems.

It is an object of the present invention to improve the prior art processes in such a way that an ideally quantitative yield of pure and tinctorially useful metal phthalocyanine is obtained in an environment-friendly and technically efficient manner.

We have found that this object is achieved by a process for preparing metal phthalocyanines by reacting dissolved or suspended aromatic ortho-dinitriles with metal donors in organic solvents or mixtures of pulverulent ortho-dinitriles with metal donors by baking, which comprises reacting the ortho-dinitriles with anhydrous ammine-metal carboxylate salt or metal-aminocarboxylic acid complexes without an alkaline additament using an ortho-dinitrile excess of from 0.005 to 15% by weight, preferably from 0.1 to 5% by weight, of ortho-dinitrile.

The process of the present invention gives pure metal phthalocyanines in most cases in yields of >90%, under optimized conditions or with optimum solvents in yields of ≧98%.

Depending on the process conditions, the synthesis products can be obtained in needles (acicular) or platelets. The ionic metal content is less than 0.01% of the total metal content of the phthalocyanine, indicating that the metal phthalocyanines obtained are very pure and environment-friendly. Moreover, the absence of chloride-containing additaments avoids the formation of unwanted toxic by-products in the synthesis.

The ammine-carboxylate salts used are the ammonia complexes of aliphatic $C_1$–$C_6$-monocarboxylic acids. Preference is given to using salts of acetic acid and propionic acid.

As well as these ammine-metal monocarboxylate salts it is also possible to use ammonia complexes of the metal salts of di- and tricarboxylic acids.

Suitable metals for the ammine-metal carboxylate salts are for example copper, silver, nickel, chromium and zinc and for the metal-aminocarboxylic acid complexes for example copper, silver, nickel, cobalt, iron, manganese, chromium and zinc.

The preferred ammine-metal carboxylate salts are diammine copper(II) acetate and diammine copper(II) propionate. The preferred metal-aminocarboxylic acid complexes are the copper complexes of glycine and of aminopropionic acid.

The ammine-metal carboxylate salts can be prepared by electrochemical metallization of the carboxylic acids. Anodic dissolution of metal in anhydrous organic electrolytes gives the carboxylate/ammine salts of the carboxylic acids. Suitable solvents for this purpose are $C_1$–$C_6$-alkanols, dimethylformamide, N-methylpyrrolidone, dimethylacetamide and N-formylmorpholine. The electrolysis is carried out in the presence of air or oxygen. The metal complexes are obtained in yields of around 98%.

As well as by electrochemical synthesis, the diammine-metal carboxylate salts can also be prepared by precipitating metal carboxylate salts, dissolved for example in $C_1$–$C_6$-alkanols or N-methylpyrrolidone, with gaseous ammonia and separating them off. The important aspect of the two options is the absence of water. The preferred diammine-metal carboxylate salts for the synthesis of metal phthalocyanines are diamine copper-(II) acetate and diammine copper(II) propionate.

If metal-aminocarboxylic acids are used, it is possible to use for example the $C_2$–$C_6$-aminocarboxylic acid salts. Suitable aminocarboxylic acids are for example glycine, α-alanine, aminopropionic acid, aminobutyric acid, sarcosine, valine and α-aminohexanoic acid.

Suitable aromatic ortho-dinitriles are for example: unsubstituted or alkyl-, alkoxy-, chlorine-, bromine- or phenyl-substituted o-phthalodinitrile such as o-phthalodinitrile, mono-, di-, tri- and tetrachloroophthalodinitrile, methoxy-o-phthalodinitrile, phenyl- and di-phenyl-o-phthalodinitrile, in which case the mono- and disubstituted dinitriles preferably have the substituents respectively in position 4 or 5 and the positions 4 and 5, also naphthalene-1,2-dinitrile and naphthalene-2,3-dinitrile. The preferred dinitrile is o-phthalodinitrile itself.

If the process is to be carried out in a solvent, the following solvents are suitable:

primary, secondary and tertiary $C_1$–$C_{12}$-alkanols, which may be linear or branched in the alkane radical, $C_2$–$C_6$-alkanediols, $C_3$–$C_6$-alkanetriols and the monoalkyl ethers of these di- and triols. Poly-$C_2$–$C_6$-alkanediols, poly-$C_3$–$C_6$-alkanetriols. N-$C_1$–$C_4$-Alkylamides and N,N-bis($C_1$–$C_4$-alkylamides) of $C_1$–$C_3$-alkanoic acids or mixtures thereof.

Specific examples of organic solvents are:

$C_1$–$C_{12}$-alkanols: methanol, ethanol, propanol, isopropanol, butanol, isobutanol, sec-butanol, amyl alcohol, isoamyl alcohol, sec-amyl alcohol, n-hexanol, isohexanol, n-heptanol, isoheptanol, n-decanol, isodecanol, n-dodecanol and isododecanol;

$C_2$–$C_6$-alkanediols and $C_3$–$C_6$-alkanetriols and polyethers thereof: ethylene glycol, diethylene glycol, triethylene glycol, polyethylene glycol with 4, 5 and 6 glycol units, 1,2-propylene glycol, 1,3-propylene glycol, dipropylene glycol, polypropylene glycol with from 3 to 6 propylene glycol units, glycerol, 1,2,4-butanetriol, 1,4-butanediol, 1,3-butanediol, 1,5-pentanediol and 1,6-hexanediol;

aliphatic carboxamides:

N-methylformamide, N,N-dimethylformamide, N-ethylformamide, N,N-diethylformamide, N,N-dipropylformamide, dimethylacetamide, N,N-diethylacetamide, N,N-dipropylacetamide, N,N-dimethylpropionamide and N,N-dipropylpropionamide.

Preferred organic solvents are the $C_1$–$C_6$-alkanols and monoalkyl ethers of ethylene glycol. Of these, the $C_3$–$C_6$-alkanols such as propanol, isopropanol, n-butanol, sec-butanol, isobutanol, tert-butanol, amyl alcohol, isoamyl alcohol and n-hexanol, sec-hexanol, isohexanol and also 2-ethylhexanol and the monoethyl and monobutyl ethers of ethylene glycol are particularly preferred, since, if they are used, high yields of phthalocyanine are obtained and the workup of the reaction mixture can be effected by filtration and simple drying of the organic liquid adhering to the phthalocyanine.

The amount of solvent is not critical, provided the reaction mixture is fully mixable before, during and after the reaction. In general, the amount of solvent used is from 4 to 40 times, preferably from 10 to 20 times, the weight of the o-dinitrile.

The highest yields of metal phthalocyanines are obtained with $C_3$- and $C_4$-alkanols, while higher alkanols give metal phthalocyanines of higher purity.

The synthesis of the metal phthalocyanines can also be effected in the presence of substances which act as catalysts, for example urea, ammonium molybdate, quinoline or hydroquinone. The concentration of the catalysts can be from 0.001 to 5% by weight, preferably from 0.05 to 0.5% by weight, based on the reaction mixture.

The solvent process gives very pure metal phthalocyanines in very good yield in a number of solvents, in particular alkanols.

Following the synthesis and removal of the pigment, solvents which contain for example ammonium acetate can be converted into ammine-metal carboxylate salts and reused for synthesis.

The synthesis of the stabilized metal phthalocyanines by the process of the invention is successful without chlorine, which easily leads to unwanted secondary reactions and represents a pollutant, by adding 4-substituted o-phthalodinitriles, eg. 4-cyano-o-phthalodinitrile, to the o-dinitriles during the synthesis. It is advantageous here to use one mole of 4-substituted o-dinitrile per 3 mol of o-dinitrile. If the ammine-metal carboxylate salts are used in the solvent process, then even short residence times and low temperatures of $\sim +100°$ C. surprisingly result in soft textured metal phthalocyanines in the $\alpha$-form, which are particularly easy to finish. Compared with existing syntheses in solvents, where the metal phthalocyanines are obtained during of the long reaction time in the thermodynamically stable beta-form, the novel synthesis with the rapid availability of the metal from the ammine-metal carboxylate salts leads to a reduction in the finishing costs, and an additional advantage is that no copper is tipped into the waste water, corrosion problems, for example due to chloride, are avoided, and no toxic by-products are produced.

The metal-aminocarboxylic acid complexes release their metal at a significantly slower rate than the ammine-metal carboxylate salts do, so that, instead of the spontaneous needle felt, the slower growth rate produces leafletlike or flaky metal phthalocyanines with the characteristics of special effect pigments. The appropriate choice of solvent and metal-aminocarboxylic acid complex makes it possible to suppress nucleation in favor of the growth reaction to such an extent that well proportioned pigment crystals in the shape of leaflets are produced.

In the tetramerization of the inert chloro-o-phthalodinitriles, eg. tetrachloro-o-phthalodinitrile, the ammine-metal carboxylate salts are far superior to the conventional syntheses with copper chlorides, so that fine crystalline phthalocyanines are obtained in high yield and in the uniform crystal shape and size at as low as 100°–120° C. Especially the formation of unwanted toxic by-products is avoided here.

As well as the reaction of the o-dinitriles with amine-metal carboxylate salts or metal-aminocarboxylic acid complexes in organic solvents, the synthesis can also be carried out without solvents, by baking pulverulent mixtures. In contradistinction to the customary baking process, involving the use of copper turnings and copper(I) chloride, the process of the invention is carried out at as low as around 100° C, producing soft textured, readily finishable metal phthalocyanines in the $\alpha$-form.

Embodiments of the process of the invention will now be more particularly described by way of example. The percentages are by weight.

EXAMPLE 1

64 g (0.5 mol) of o-phthalodinitrile and 27 g (0.125 mol) of diamminecopper(II) acetate are thoroughly mixed and heated to 90° C., at which point a soft/brittle textured blue pigment forms spontaneously with the temperature rising to 190° C., and ammonium acetate vapor evolving. Cooling leaves 87.6 g of crude CuPC in the radiographic alpha-S-form.

Its purity is determined by boiling for two hours in a Dupont solvent mixture comprising 450 ml of ethanol, 400 ml of glacial acetic acid and 50 ml of toluene. Following filtration through a frit of type G 4, washing and drying, the Dupont purity is 78.8%.

From this the CuPC yield works out as 95.8% of theory.

EXAMPLE 2

51.2 g (0.4 mol) of o-phthalodinitrile and 21.6 g (0.1 mol) of diamminecopper(II) acetate are heated in 250 ml of isobutanol to about 100° C., at which point a deep blue needle felt crystallizes out spontaneously; dilution with 50% strength methanol yields 55.0 g of a 96.7% pure alpha-copper phthalocyanine, which corresponds to a conversion of 92.3% of theory. (The ionic copper content was 0.01%.)

EXAMPLE 3

When Example 2 is carried out in n-butanol, the exothermic tetramerization reaction starts at 96° C. and rises to 116° C., precipitating bluish violet needle felt crystals.

Yield: 56.0 g of crude alpha-CuPC having a Dupont purity of 94.9%, corresponding to a conversion of 92.2% of theory. The ionic copper content was 0.01%.

Other alcohols resulted in the following data:

| Example | Solvent | Exotherm | Crude yield | Dupont purity | % of theory |
| --- | --- | --- | --- | --- | --- |
| 5 | n-Hexanol | 130°→148° | 52.2 g | 98.1% | 88.9 |
| 6 | Methylglycol | 96°→115° | 52.0 g | 96.2% | 86.9 |
| 7 | Butylglycol | 110°→150° | 50.6 g | 97.5% | 85.7 |

The pigments obtained according to Examples 4 to 6 were likewise identified as copper phthalocyanines in the alpha-S-form.

EXAMPLE 8

When Example 2 is carried out in N-methylpyrrolidone, the exothermic tetramerization reaction starts at 102° C. and produces a thick paste of acicular crystals while the temperature rises to 156° C. A customary workup leaves 53 g of crude alpha-CuPC having a Dupont purity of 99.6%, which corresponds to a yield of 91.7% of theory.

EXAMPLE 9

When Example 7 is carried out with a 5% excess of o-phthalodinitrile—in order to be sure that all the copper reacts—the yield rises to 54.9 g of a bluish violet copper phthalocyanine of the beta-form with a Dupont purity of 99.8%; ie. 95.1% conversion. The ionic copper content was down to ≦0.005%.

Higher o-phthalodinitrile excesses and/or a more dilute procedure, ie. with more solvent, reusable as mother liquor after renewed coppering, increase the yield of crude blue only minimally.

EXAMPLE 10

Example 8 repeated with 25% more N-methylpyrrolidone produces a yield of bluish violet needles of 55.0 g of crude beta-copper phthalocyanine having a Dupont purity of 99.9%, ie. a conversion of 95.4% of theory.

EXAMPLE 11

19.2 g (0.15 mol) of o-phthalodinitrile, 10.4 g (0.05 mol) of 4-phenyl-o-phthalodinitrile and 12.3 g (0.05 mol) of diamminecopper(II) acetate are heated in ml of N-methylpyrrolidone. At 116° C., spontaneous pigment formation takes place, the temperature rises to ° C; dilution with aqueous methanol yields 28.9 g of crude blue; since substituted CuPC is somewhat soluble in organic solvents, the crude blue was reprecipitated from concentrated sulfuric acid; yield =91.9%, corresponding to a yield of 81.7%.

Analysis: $C_{38}H_{20}N_8Cu$ (molecular weight 652.194)
calculated: 69.98% C 3.09 H 17.18% N 9.75% Cu
found: 69.0% C 3.4 H 17.0% N 9.4% Cu

EXAMPLE 12

38.4 g (0.3 mol) of o-phthalodinitrile, 17.3 g (0.1 mol) of 4-nitro-o-phthalodinitrile and 12.3 g (0.1 mol) of diamminecopper(II) acetate are heated in ml of N-methylpyrrolidone. The exothermic reaction starts at 130° C., producing a thick blue crystalline paste with a rise in temperature to 154° C. The workup yields 58.4 g of bluish violet needles in the radiographically pure alpha-form, which remain fully intact even on boiling in toluene.

Following purification with sulfuric acid the purity is 96.2% and the yield 90.6%.

Analysis: $C_{32}H_{15}N_9O_2Cu$ (molecular weight 621.093)
calculated: 61.88% C 2.44 H 20.30% N 10.23% Cu
found: 61.5% C 2.6 H 20.2% N 9.9% Cu

EXAMPLE 13

74 g (0.4 mol) of t-butyl-o-phthalodinitrile and 22 g (0.1 mol) of diamminecopper(II) acetate are heated in 200 ml of dimethylformamide. An exothermic reaction takes place, resulting at 107° C. in the spontaneous formation of bluish violet circular crystals (final temperature: 128° C.); working up with dilute methanol gives 67.7 g of crude pigment in the radiographically pure alpha-form, which remains intact even on boiling in toluene; purity after reprecipitation from sulfuric acid: 94.5%, corresponding to a yield of 80% of theory.

EXAMPLE 14

On repeating Example 13 without solvent the exothermic reaction takes the temperature of 107° C., to 172° C., resulting in the production of 89.3 g of crude pigment with sublimation of ammonium salt. Boiling out in dilute hydrochloric acid leaves 72.2 g of pure pigment (=90.4% of theory).

Analysis: $C_{48}H_{48}N_8Cu$ (molecular weight 800.528)
calculated: 72.02% C 6.04 H 14.00% N 7.94% Cu
found: 71.8% C 5.9 H 14.2% N 7.8% Cu

EXAMPLE 15

52 g (0.4 mol) of 1,2-dicyanopyrazine and 21.6 g (0.1 mol) of diamminecopper(II) acetate are heated in 200 ml of N-methylpyrrolidone with stirring; bluish black crystals precipitate at 92° C., and the temperature rises to 136° C. Dilution with methanol and isolation in a conventional manner leaves 58.1 g of approximately 99.2% pure pigment, ie. 98.7% yield.

Analysis: $C_{24}H_8N_{15}Cu$ (molecular weight 584.00)
calculated: 49.36% C 1.38 H 38.38% N 10.88% Cu
found: 48.3% C 2.0 H 36.9% N 10.6% Cu

EXAMPLE 16

26.6 g (0.01 mol) of tetrachloro-o-phthalodinitrile (92.7% pure), 5.5 g (0.05 mol) of diamminecopper(II) acetate and 0.1 g of ammonium molybdate are heated in 100 ml of o-dichlorobenzene to 150° C., with stirring, and a thick, green mass of crystal forms. After one hour it is diluted with 100 ml of methanol and filtered with suction, and the crystalline filter residue is washed and dried, leaving 26.8 g of crude green pigment having a Dupont purity of 86.6%, which corresponds to a yield of 88.7% of theory.

EXAMPLE 17

266 g (1 mol) of tetrachloro-o-phthalodinitrile (92.7% pure), 54 g (0.25 mol) of diamminecopper(II) acetate and 0.2 g of ammonium molybdate are heated in 600 ml of Solvesso (mixture of tri- and tetraalkylbenzenes, boiling point 180°-200° C.): at 160° C., green crystalline needles form; after two hours they are worked up with methanol: 268.3 g of crude green, Dupont purity =93.1%, yield 95.6% of theory.

EXAMPLE 18

On repeating Example 17 with nitrobenzene instead of Solvesso, 255.3 g are obtained of a 93.9% pure crude green, which corresponds to a conversion of 91.8% of theory.

EXAMPLE 19

107 g (0.4 mol) of tetrachloro-o-phthalodinitrile (92.7% pure) are heated in 250 ml of o-nitrotoluene to 130° C. with stirring and mixed with 25 g (0.1 mol) of diamminecopper(II) propionate; the temperature rises to 178° C. and a thick, green mass of crystals precipitates; conventional dilution with methanol gives 96.0 g of a 92.6% pure crude green, corresponding to a yield of 84.6%.

EXAMPLE 20

Semicyano copper phthalocyanine 44.8 g (0.35 mol) of o-phthalodinitrile, 7.7 g (0.05 mol) of 1,2,4-tricyanobenzene=4-cyano-o-PDN and 24.5 g (0.1 mol) of diamminecopper(II) propionate are heated in 200 ml of N-methylpyrrolidone with stirring; the temperature rises from 120° C. to 150° C. while ammonium salt sublimes and the crude blue precipitates spontaneously as a thick pigment suspension. After dilution with aqueous methanol the workup yields 55.7 g of a 96.2% pure semicyano copper phthalocyanine comprising 50% each of the alpha- and beta-form (conversion=91.2% of theory); after the toluene test (=boiling for one hour in toluene) 28% is still in the alpha-form.

EXAMPLE 21

25.5 g (0.2 mol) of o-phthalodinitrile and 11.0 g (0.05 mol) of diglycinecopper are heated in 100 ml of N-methylpyrrolidone to 170° C., and bluish violet crystal leaflets slowly precipitate. After 3 hours they are filtered off with suction, washed with methanol and dried, yielding 22.8 g of a 94.9% pure copper phthalocyanine of the beta-form in the uniform shape of leaflets which are suitable for special effect pigments.

EXAMPLE 22

On repeating Example 21 with the addition of 0.1 g of ammonium molybdate as catalyst, 22.3 g are obtained of a 98.1% pure copper phthalocyanine of the beta-form in the shape of shiny violet crystal leaflets which represent an excellent special effect pigment.

We claim:

1. A process for preparing metal phthalocyanines by reacting dissolved or suspended aromatic ortho-dinitriles with metal donors in organic solvents or mixtures of pulverulent ortho-dinitriles with metal donors by baking, which comprises reacting the ortho-dinitriles with anhydrous ammine-metal carboxylate salt or metal-aminocarboxylic acid complexes without an alkaline additament using an ortho-dinitrile excess of from 0.1 to 5% by weight of ortho-dinitrile.

2. A process as claimed in claim 1, wherein the carboxylic acids used for the ammine-metal carboxylate salt are $C_1$–$C_6$-monocarboxylic acids.

3. A process as claimed in either of claim 1, wherein the ammine-metal carboxylate salt used is diammine copper(II) acetate or diammine copper(II) propionate.

4. A process as claimed in claim 1, wherein the ammine-metal carboxylate salts are prepared by electrochemical metallization of the $C_1$–$C_6$-monocarboxylic acids in $C_2$–$C_6$-alkanols or N-methylpyrrolidone and subsequent precipitation by gasification with ammonia.

5. A process as claimed in claim 1, wherein metal carboxylate salts dissolved in $C_2$–$C_6$-alkanols or N-methylpyrrolidone are reacted by precipitation with ammonia to form ammine-metal carboxylate salts.

6. A process as claimed in claim 1, wherein the metal-aminocarboxylic acid complexes used are the metal complexes of $C_2$–$C_6$-aminocarboxylic acids.

7. A process as claimed in claim 1, wherein the organic solvents used for the metal phthalocyanine synthesis are aliphatic $C_1$–$C_6$-alkanols, N-methylpyrrolidone, dimethylformamide, o-dichlorobenzene, tri- and tetraalkylbenzene mixtures (Solvesso), nitrobenzene and o-nitrotoluene.

8. A process as claimed in claim 1, wherein acicular metal phthalocyanines are prepared using the ammine-metal carboxylate salts of $C_1$–$C_6$-monocarboxylic acids.

9. A process as claimed in claim 1, wherein platelike metal phthalocyanines are prepared using metal-aminocarboxylic acid complexes.

* * * * *